United States Patent
Hermansen et al.

(10) Patent No.: US 6,205,885 B1
(45) Date of Patent: Mar. 27, 2001

(54) CLIPLESS BICYCLE PEDAL

(76) Inventors: Frank Hermansen; Carl Winefordner, both of 21542 Ann's La., Laguna Beach, CA (US) 92651

( * ) Notice: Subject to any disclaimer, the term of this patent is extended or adjusted under 35 U.S.C. 154(b) by 0 days.

(21) Appl. No.: 09/391,709

(22) Filed: Sep. 8, 1999

(51) Int. Cl.$^7$ .................................................. G05G 1/14
(52) U.S. Cl. .......................................................... 74/594.6
(58) Field of Search .............................. 74/594.4, 594.6; 36/131

(56) References Cited

U.S. PATENT DOCUMENTS

| | | | |
|---|---|---|---|
| 4,922,786 | * 5/1990 | Romano | 74/594.6 |
| 5,203,229 | 4/1993 | Chen | 74/594.6 |
| 5,325,738 | 7/1994 | Bryne | 74/594.6 |
| 5,417,128 | 5/1995 | Beyl | 74/594.6 |
| 5,765,450 | * 6/1998 | Kruger et al. | 74/594.6 |

* cited by examiner

*Primary Examiner*—David A. Bucci
*Assistant Examiner*—Chong H. Kim

(57) ABSTRACT

A clipless bicycle with a latch release mechanism that is concentric to the spindle axis that allows cleat engagement on four sides of the pedal. The pedal includes a spindle with a thread on one end for attachment to a bicycle crank arm, a housing that rotates about the spindle on bearings, two U-shaped members that are affixed to opposite sides of the housing, two sleeves that slip over opposite ends of the housing allowing the sleeves to rotate concentrically about the axis of the spindle, two U-shaped members that are affixed to opposite sides of the sleeves, a torsion spring that is concentrically positioned over the housing such that it holds the U-shaped members that are attached to the housing perpendicular to the U-shaped members that are affixed to the sleeves, and a cleat for mounting on the bottom of a bicycling shoe that can releasibly engage between any of the four adjacent pairs of U-shaped members. The spring has a coil axis that is coincident with the spindle axis. A threaded plug retains the housing assembly on the spindle. An O-ring seals the housing against the Spindle on one end and another O-ring seals the housing against the plug on the other end. A spacer holds the spring in position. The housing, sleeves, bent wire members, spindle, and cleat are made of stainless steel, titanium, or some other material that has the strength and corrosion resistance required. The cleat has two shoulders that can engage under the bent U-shaped members.

20 Claims, 5 Drawing Sheets

CLIPLESS BICYCLE PEDAL

BACKGROUND OF THE INVENTION

A number of clipless pedal designs have been made commercially available. The first clipless pedals were single side entry because they had latch and release mechanisms on only one side of the pedal. The next clipless pedals were double side entry because they had latch and release mechanisms on opposite sides of the pedal. The advantage of double side entry is that it is easier for the rider to clip into the pedal without looking. The disadvantage is that double side entry pedals are generally more complex and heavier than single side entry pedals.

A cleat is attached to the bottom of each cycling shoe and when the rider steps onto the clipless pedal and applies force, the latch mechanism opens to accept the cleat and then latches shut to lock the cleat to the pedal. The rider releases himself or herself from the pedal by twisting their shoe past a given angle. Pedal/cleat designs can allow float or not depending on the pedal and cleat design. Float is when the cleat is free to pivot through some angle such as 5 degrees each direction before making contact with the release mechanism. Some riders prefer to have float because of knee comfort and others prefer no float. Some pedals offer one cleat that allows float and a different cleat that allows no float.

Clipless pedals either have the latch mechanism in the pedal or in the cleat which is attached to the shoe. Designs with the latch mechanism in the cleat are generally lighter but perform poorly in muddy conditions because cleats are usually larger and have moving parts and are prone to getting clogged with mud and dirt from occasional walking on the ground. Also, because they are usually larger, they can interfere with walking. Designs with the latch mechanism in the pedal generally consist of a relatively large number of components making them complex to manufacture and maintain, and relatively bulky and heavy. Also, while designs with latch mechanisms in the pedal are less prone to clogging with mud than designs with the latch mechanism in the cleat, most are still susceptible to clogging under certain conditions which makes some pedals difficult to lock into and others difficult to clip out of.

In order to prevent release while pulling upwards while pedaling, either the spring(s) that holds the mechanism closed needs to be very strong or the geometry must be designed such that when the cleat is pulled straight up, there is not a component of force to cause the mechanism to release.

Spring loaded latch mechanisms on existing pedal designs have clasps that pivot about axes that are not coincident with the axis of pedal rotation. There is some distance between the pedal axis and the clasp axis or axes. Because of this, existing pedal designs have a framework to support the clasp axle and this causes the pedal to be relatively bulky in size.

SUMMARY OF THE INVENTION

An object of the present invention is to provide a clipless pedal for bikes which is made with four sides which can engage the cleat.

Another object of the present invention is to provide a clipless bike pedal system which is sturdy enough to meet the rigorous demands of mountain biking yet is easy to use.

Another object of the present invention is to provide a cleat for use with clipless bike pedals which is easy to engage and disengage and is resistant to effects of dirt or debris which might otherwise damage or incapacitate a locking mechanism.

Another advantage of the present invention is to provide a cleat for use with clipless pedals which is small enough to be substantially retained within the recessed area in the soles of commercially-available mountain bike shoes so that it is generally protected from impact and does not interfere with walking.

Another object of the present invention is to provide a clipless bike pedal system which minimizes the distance from bottom of the cycling shoe to the centerline of the pedal to lower the rider's center of gravity and make pedaling more stable.

Another object of the present invention is to provide a clipless bike pedal system which minimizes the distance from the centerline of the pedal to the bottom of the pedal for improved ground clearance while pedaling.

Another object of the present invention is to provide a clipless bike pedal which has easy maintenance including easy disassembly and reassembly.

Another object of the present invention is to provide a clipless bike pedal system which is relatively light in weight.

Another object of the present invention is to provide, by virtue of its simplicity, a clipless bike pedal that is highly resistant to clogging with mud.

The foregoing and other objects are attained, according to the present invention, by a pedal including a spindle with a thread on one end for attachment to a bicycle crank arm, a substantially cylindrical housing that rotates about the spindle on bushings or bearings, two substantially U-shaped members that are made from bent wires that are affixed to opposite sides of the housing, two sleeves that slip over opposite ends of the housing allowing the sleeves to rotate concentrically about the axis of the spindle, two substantially U-shaped members that are made from bent wires that are affixed to opposite sides of the sleeves, a torsion spring that is concentrically positioned over the housing such that it holds the U-shaped members that are attached to the housing perpendicular to the U-shaped members that are affixed to the sleeves, and a cleat for mounting on the bottom of a bicycling shoe that can releasibly engage between any of the four adjacent pairs of substantially U-shaped members. The spring has a coil axis that is coincident with the spindle axis. A threaded plug retains the housing assembly on the spindle. An O-ring seals the housing against the Spindle on one end and another O-ring seals the housing against the plug on the other end. A spacer holds the spring in position. The housing, sleeves, bent wire members, spindle, and cleat are made of stainless steel, titanium, or some other material that has the strength and corrosion resistance required. The cleat has two shoulders that can engage under the bent U-shaped members.

When assembled, the housing spins freely on the spindle via either bushings or bearings. The spring holds the bent U-shaped member pairs generally perpendicular to each other but allows relative rotation in both directions between them when enough force is applied to overcome the spring. In this way the cleat can snap into any of four sides of the pedal. The cleat is released from the pairs of bent U-shaped members when the cleat is sufficiently twisted. The cleat can be designed to spread the bent U-shaped member pairs which causes at least one of the two cleat shoulders to release from the pedal. This design requires the rider to twist the shoe hard enough to overcome the spring pressure that holds the bent U-shaped member pairs perpendicular. Alternatively, the cleat can be designed so that upon sufficient rotation of the shoe, one or both cleat shoulders are no longer engaged with the bent U-shaped member pairs. This design does not require the rider to overcome spring pressure. A third variation of cleat allows a certain amount of freeplay (float) prior to the cleat beginning to spread the bent U-shaped member pairs.

By virtue of the simplicity and openness of the pedal's structure, it is unlikely that mud will clog the pedal. Also, because the cleat has no moving parts, mud is less likely to cause problems when locking into the pedal.

The spring loaded locking mechanisms herein described are applicable to any number of releasable attachment applications and are not limited to use on clipless bicycle pedals. The locking mechanism provides easy engagement, a durable attachment which allows a limited amount of relative motion and easy disengagement by cleat rotation.

A typical double side entry prior art clipless pedal, U.S. Pat. No. 5,203,229, has 40 components including the cleat. Conversely, the pedal herein has only 16 components including the cleat and only 11 independent components after a welding or soldering process.

BRIEF DESCRIPTION OF THE DRAWINGS

The aforementioned objects and advantages of the present invention, as well as additional objects and advantages thereof will be more fully understood hereinafter, as a result of a detailed description of preferred embodiments thereof, when taken in conjunction with the following drawings in which.

Figures 1, 2:
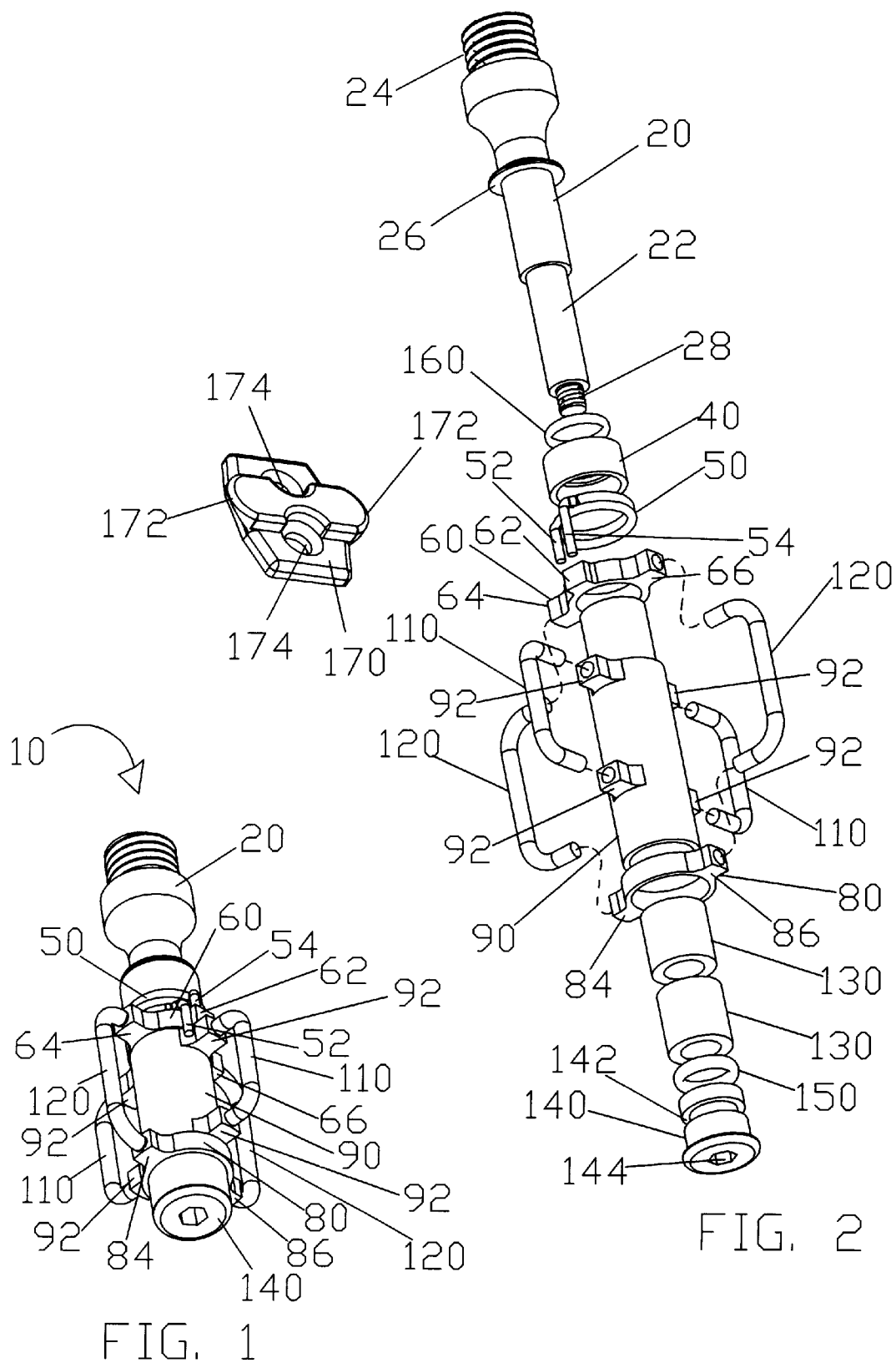
FIG. 1 is a perspective view of the pedal.
FIG. 2 is an exploded perspective view of the pedal and cleat.

The description herein refers to reference numerals in the accompanying drawings and reference numerals refer to the parts therein having the following definitions:

REFERENCE NUMERALS IN DRAWINGS 10 clipless bicycle pedal
20 spindle
22 bearing surface
24 thread
26 flange
28 thread
32 hexagonal hole
40 spacer
50 spring
52 spring leg
54 spring leg
60 first sleeve
62 boss
64 boss
66 boss
80 second sleeve
84 boss
86 boss
90 housing
92 housing boss
110 narrow latch
120 wide latch
130 bushing
140 end plug
142 oring groove
144 hexagonal hole
146 thread
150 oring
160 oring
170 cleat
172 shoulders
174 mounting holes
176 surface

DETAILED DESCRIPTION OF PREFERRED EMBODIMENT

The preferred embodiment of the present invention may be understood by referring to FIGS. 1–13. It will be seen that a pedal 10 comprises a spindle 20, a cylindrical housing 90 that rotates about the spindle on two bushings 130, two narrow latches 110 made from bent wire so they become substantially U-shaped members that are affixed to opposite sides of the housing 90, a first sleeve 60 and second sleeve 80 that slip over the opposite ends of the housing 90 allowing the sleeves 60 and 80 to rotate concentrically about the axis of the spindle 20, two wide latches 120 made from bent wire so they become substantially U-shaped members that are affixed to opposite sides of the housing 90, a torsion spring 50 that is concentrically positioned over the housing 90 such that it holds the wide latches 120 perpendicular to the narrow latches 110, and a cleat 170 for mounting on the bottom of a bicycling shoe that can engage on any of four sides of the pedal 10 between any of the four adjacent pairs of wide latch 120 and narrow latch 110 combinations. A threaded end plug 140 retains the housing 90 on the spindle 20. An Oring 160 seals the housing against the spindle on one end and an Oring 150 seals the housing against the plug on the other end. A spacer 40 is pressed onto the housing 90 and holds the spring 50 in position. The housing 90, sleeves 60 and 80, latches 110 and 120, spindle 20, and cleat 170 are preferably made of stainless steel, titanium, or some other material that has the strength and corrosion resistance required. The cleat 170 has two shoulders 172 that can engage between the latch pairs 110 and 120.

In FIG. 1, the pedal 10 has a spindle 20 which can rotate within the housing 90. In the assembly, two narrow latches 110 are soldered or welded to the four bosses 92 of housing 90. two wide latches 120 are soldered or welded to the bosses 64 and 66 of a first sleeve 60 and bosses 84 and 86 of a second sleeve 80 and can swivel up to about 70 degrees in both directions from being perpendicular to the narrow latches 110. A torsion spring 50 is concentrically positioned over the housing 90. The spring legs 52 and 54 hold the wide latches 120 perpendicular to the narrow latches 110 by forcing sleeve boss 62 to be aligned with a housing boss 92. The spring 50 is forced to unwind whenever the wide latches 120 are pushed away from perpendicular to narrow latches 110 regardless of the direction moved. An end plug 140 retains the housing 90 to spindle 20.

In FIG. 2, the spindle 20 has a thread 24 that screws into a bicycle crank arm (not shown), a bearing surface 22, a flange 26, and a thread 28 that fits end plug 140. A spacer 40 is pressed onto the housing 90 and encloses an o-ring 160 that in effect seals the spindle 20 to the housing 90. The spacer 40 also holds the spring 50 closely to the first sleeve 60 and takes out slop between the housing 90 and the spindle flange 26. The spring 50 has legs 52 and 54 that align sleeve boss 62 with a housing boss 92. After the first sleeve 60 is slipped onto one end of housing 90 and the second sleeve 80 is pushed onto the other end of housing 90, then the two wide latches 120 are welded or soldered to the bosses 64 and 66 of sleeve 60 and bosses 84 and 86 of sleeve 80. The two narrow latches 110 are welded or soldered to the housing bosses 92. Two bushings 130 fit inside the housing 90 and ride against bearing surface 22 of spindle 20. An end plug 140 has an o-ring groove 142 that holds o-ring 150 and seals against the inside of housing 90. The end plug 140 screws to thread 28 of spindle 20 and is tightened by a hexagonal key placed inside the hexagonal hole 144. A cleat 170 has two shoulders 172 and two mounting holes 174. The only maintenance required will be occasional replacement of the bushings 130 and the occasional replacement of cleat 170. To replace the bushings 130, plug 140 is removed using a hexagonal key. Then the spindle 20 can then be pulled out of the housing 90 which will leave the bushings 130 readily accessible for inspection or replacement. Both the narrow and wide latches, 110 and 120 respectively, are made from substantially U-shaped members.

Figure 3:
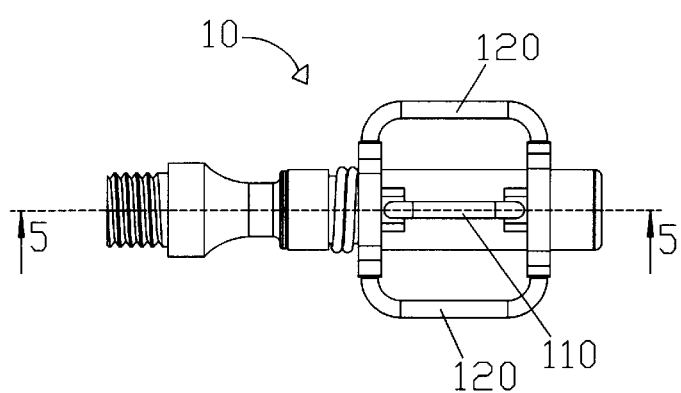
FIG. 3 is a side view of the pedal with the wide latches in an up and down orientation.

In FIG. 3, the pedal 10 is shown with the wide latches 120 in an up and down orientation. One of the two narrow latches 110 can be seen.

Figure 4:
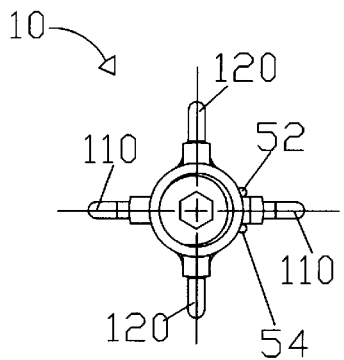
FIG. 4 is an end view of the pedal shown in FIG. 3.

In FIG. 4, the pedal 10 shows wide latches 120 that are held perpendicular to the narrow latches 110 by spring 50 (not shown) legs 52 and 54. Neglecting the spring 50 (not shown in this Fig.), the pedal 10 is substantially symmetric about the two centerlines shown.

Figure 5:
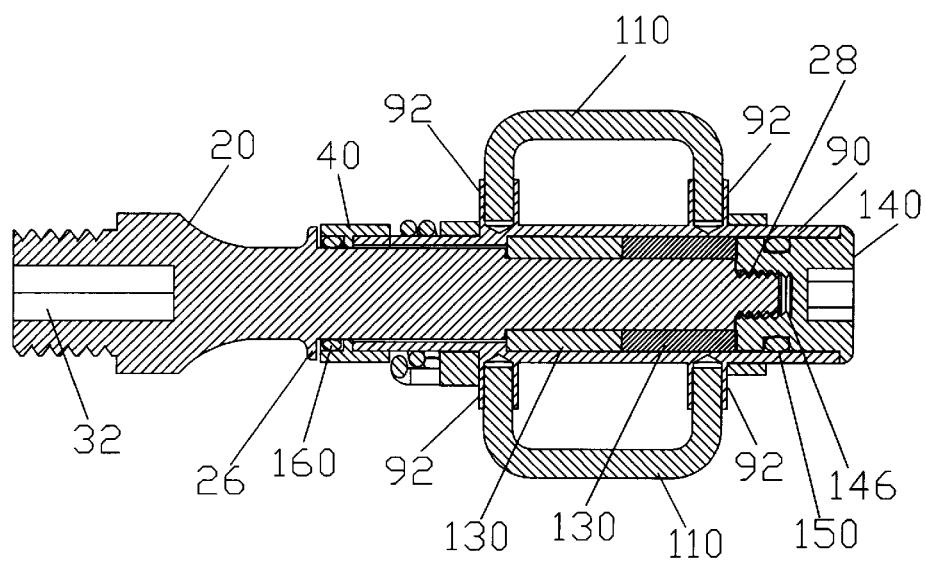
FIG. 5 is a cross sectional view of the pedal assembly shown in FIG. 3.

FIG. 5 shows that the narrow latches 110 are welded or soldered to the bosses 92 so they become rigid members of the housing structure. The thread 146 of end plug 140 is screwed to thread 28 of spindle 20. The two bushings 130 allow the spindle 20 to rotate relative to the housing 90. O-rings 150 and 160 keep outside contamination such as water and dirt away from the bushings 130. Spacer 40 is pressed onto the housing 90 and prevents the housing 90 from sliding towards the hexagonal hole 32 of spindle 20.

Figure 6:
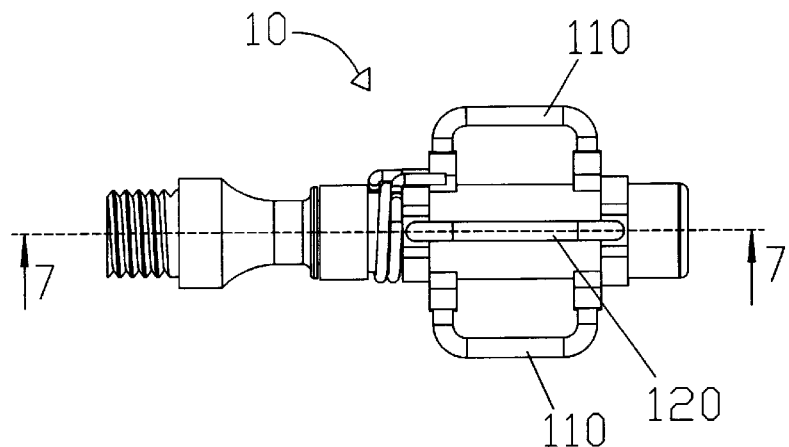
FIG. 6 is a side view of the pedal rotated 90 degrees from the pedal shown in FIG. 3.

In FIG. 6, the pedal 10 is rotated such that the pedal has the narrow latches 110 in an up and down orientation. One of the two wide latches 120 can be seen.

Figure 7:
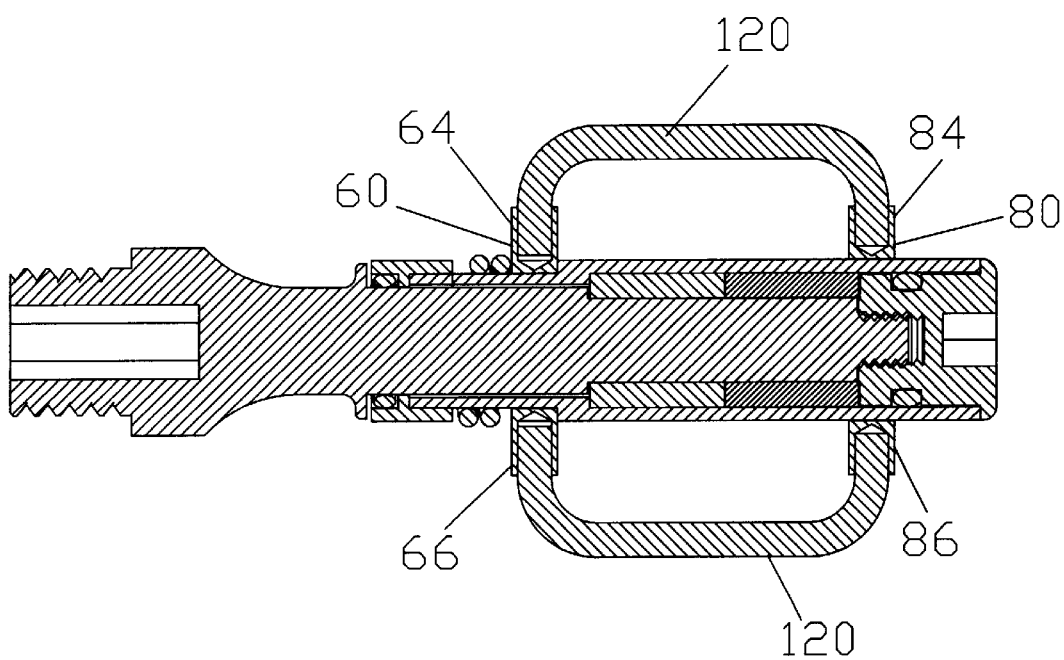
FIG. 7 is a cross sectional view of the pedal assembly shown in FIG. 6.

FIG. 7 shows the wide latches 120 are welded or soldered to the bosses 64 and 66 of sleeve 60 and bosses 84 and 86 of sleeve 80.

Figure 8:
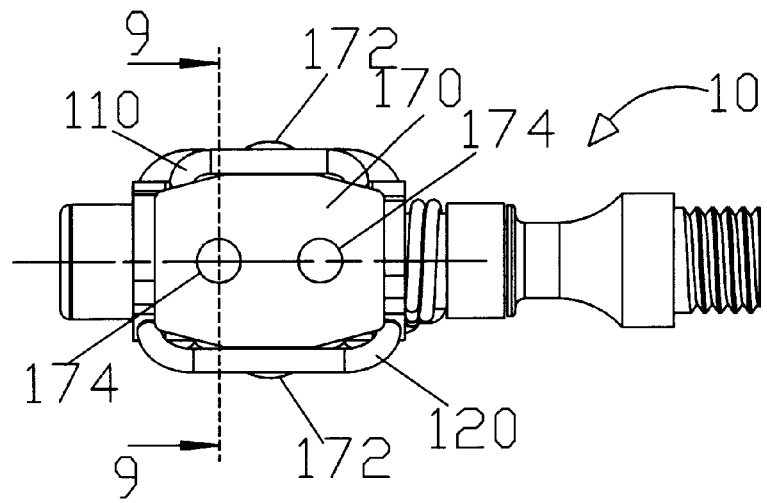
FIG. 8 is a top view of the cleat engaged with the pedal.

In FIG. 8, the cleat 170 is engaged with the pedal 10. The two shoulders 172 of cleat 170 are caught underneath a narrow latch 110 and a wide latch 120. Two mounting holes 174 are used to attach the cleat 170 to a cycling shoe (not shown). The cleat 170 is symmetric about the centerline shown. When the cyclist twists their foot, cleat 170 will twist which causes the wide latch 120 to move away from the narrow latch 110 which will release the cleat from the pedal upon sufficient twisting. The cleat is designed to allow a few degrees of float (twist without spring force) prior to causing the latches 110 and 120 to spread.

Figure 9:
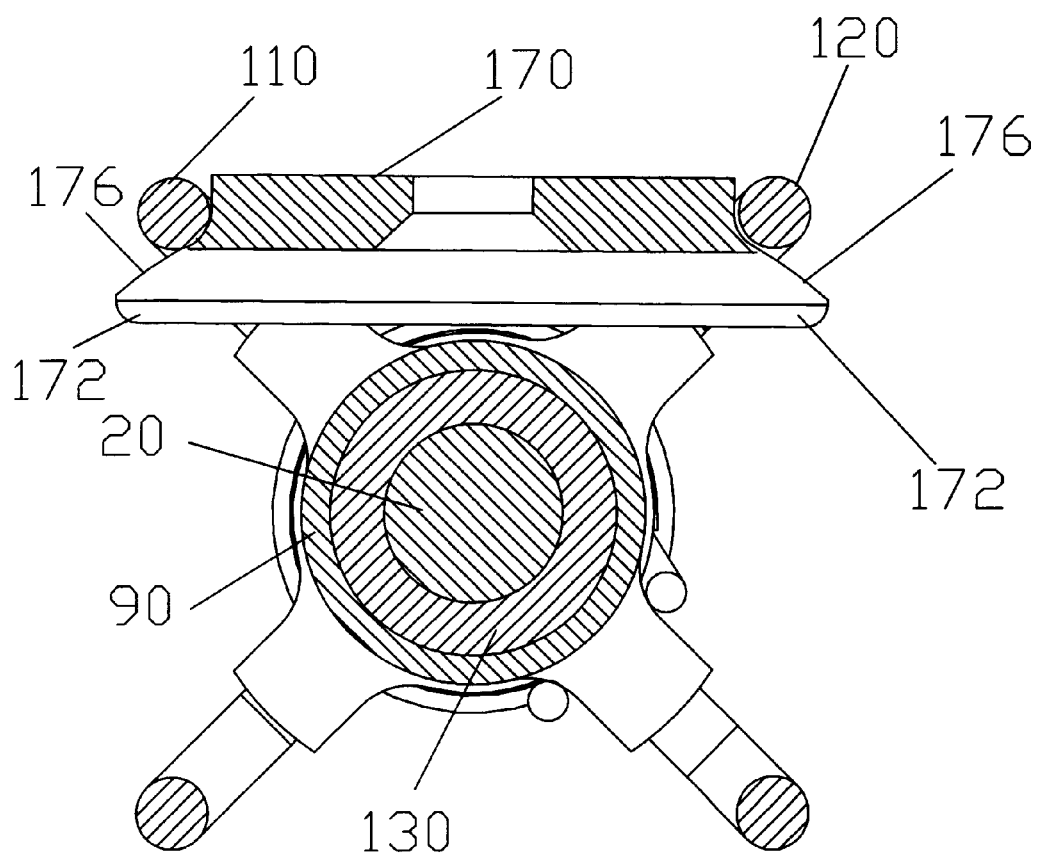
FIG. 9 is a cross sectional view of the pedal and cleat shown in FIG. 8.

FIG. 9 shows that the surface 176 of shoulder 172 of cleat 170 is curved about the centerline of spindle 20 so that as the latches 110 and 120 rotate to accept shoulders 172, the cleat 170 does not move relative to spindle 20. Bushing 130 allows the housing 90 to rotate about the spindle 20.

Figure 10:
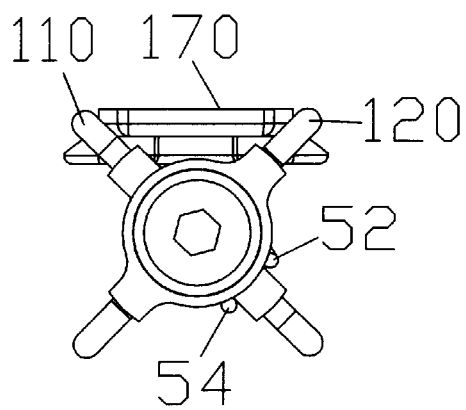
FIG. 10 is an end view of the pedal and cleat shown in FIG. 8.

In FIG. 10, cleat 170 is shown locked between one of the adjacent pairs of wide and narrow latches 120 and 110, respectively of the pedal. Spring legs 52 and 54 hold the narrow latch 110 perpendicular to the wide latch 120.

Figure 11:
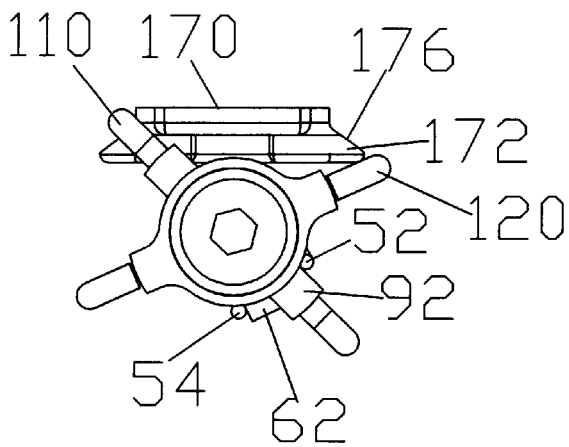
FIG. 11 is an end view of the pedal shown in FIG. 10 with the wide latch rotated to allow engagement of the cleat.

In FIG. 11, the wide latch 120 is rotated to allow engagement of the cleat 170. This rotation occurs from the cyclist pressing his or her foot downwards which causes the shoulder 172 of cleat 170 to push apart the wide latch 120 from the narrow latch 110 by overcoming the spring pressure that normally holds the wide latches 120 perpendicular to the narrow latches 110. Spring end 54 pushes against boss 62 while spring end 52 pushes against boss 92. When the cleat 170 has pushed the wide latch 120 sufficiently far from narrow latch 110, wide latch 120 will snap over surface 176 of shoulder 170 such that it locks the cleat to the pedal as shown in FIG. 10.

Figure 12:
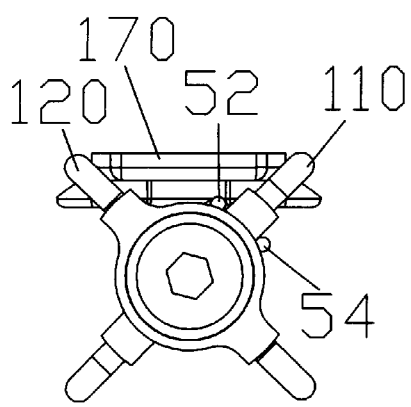
FIG. 12 is an end view of the pedal and cleat shown in FIG. 10 with the cleat engaged between a different pair of latches and the pedal rotated 90 degrees.

In FIG. 12, the cleat 170 is engaged between a different pair of latches 110 and 120 than shown in FIG. 10 and the pedal is rotated 90 degrees. Because the cleat 170 is substantially symmetric, it can lock into the pedal with the wide latch 120 or the narrow latch 110 at the front and it will feel the same to the cyclist. There is sufficient clearance beneath the cleat 170 to not interfere with the spring ends 52 and 54.

Figure 13:
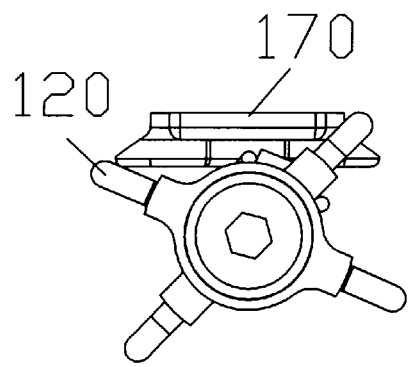
FIG. 13 is an end view of the pedal shown in FIG. 12 with the wide latch rotated to allow engagement of the cleat.

In FIG. 13, the wide latch 120 is rotated to allow engagement of the cleat 170.

OTHER EMBODIMENTS

Now that the preferred embodiment is described, those skilled in the art will readily imagine other embodiments. For example, the latches 110 and 120 could be made of materials other than bent wire such as machined or forged metal and could have cross sections that are not round. Also, latches 110 and 120 are made from substantially U-shaped wire members which could have many variations of bends or curves and still be described as having a U-shape. Essentially, the latches can be made from any variation of hooked members as long as they provide a surface for the shoulders of the cleat to lock underneath. For example, the latches could have multiple curves or straight sections. It is also possible to describe the latches in the preferred embodiment as having a substantially rectangular shape instead of U-shape because the four U-shaped latches could be viewed as being two rectangular latches.

Also, the housing 90 and narrow latches 110 could be machined or formed from a single piece rather than three parts soldered together. The bushings 130 could be bearings such as needle bearing cartridges or ball bearings instead of bushings. There are many alternative configurations possible that would spring-load the latch pairs to be perpendicular to each other and yet allow motion in both directions. For example, there could be one spring on each end of the housing such that each spring is only twisted in one direction. Another alternative is a single spring that has one end keyed to the housing and the other keyed to one of the sleeves so that when the wide latches are moved in one direction, the spring unwinds and when moved in the other direction, the spring winds tighter. Other types of springs are also possible, such as using elastomers or compression or extension springs. While the preferred embodiment has four latches giving it four sides to lock into, another embodiment could be three sided, or five or more sided. For example, someone skilled in the art, based upon the present disclosure could readily design a six sided pedal using six substantially U-shaped members wherein a spring or springs hold each member about 60 degrees apart from adjacent members.

It will thus be evident that there are many additional embodiments which are not illustrated above but which are clearly within the scope and spirit of the present invention.

The above description and drawings are therefore intended to be exemplary only and the scope of the invention is to be limited solely by the appended claims.

We claim:

1. A bicycle pedal for releasibly engaging a cleat affixed to the bottom of a shoe, said pedal comprising:
    a spindle with a thread on one end for attachment to a bicycle crank arm;
    a housing that rotates about said spindle; and
    a spring loaded latch mechanism that pivots concentrically with the axis of said spindle, wherein said latch mechanism comprises:
        a plurality of substantially U-shaped members; and
        at least one spring that holds said U-shaped members apart from each other at substantially equal angles of spacing;
    wherein said latch mechanism allows engagement with said cleat between adjacent pairs of said U-shaped members.

2. The bicycle pedal according to claim 1 wherein said spring has a coil axis that is substantially coincident with said axis of said spindle.

3. The bicycle pedal according to claim 2 wherein two of said U-shaped members are affixed to said housing and other said U-shaped members pivot on said housing.

4. The bicycle pedal according to claim 2 wherein all of said U-shaped members pivot on said housing.

5. The bicycle pedal according to claim 3 wherein said housing rotates about said spindle on at least one bearing.

6. The bicycle pedal according to claim 5 wherein said pedal is substantially symmetric about the axis of said pedal along each of two perpendicular planes.

7. The bicycle pedal according to claim 6 wherein said U-shaped members are formed in part by bent wire.

8. A bicycle pedal for releasibly engaging a cleat affixed to the bottom of a shoe, said pedal comprising:
    a spindle with a thread on one end for attachment to a bicycle crank arm;
    a housing that rotates about said spindle; and
    a spring loaded latch mechanism that pivots concentrically with the axis of said spindle, wherein said latch mechanism comprises:
        a plurality of hooked members; and
        at least one spring that holds said hooked members apart from each other at substantially equal angles of spacing;
    wherein said latch mechanism allows engagement with said cleat between adjacent pairs of said hooked members.

9. The bicycle pedal according to claim 8 wherein said spring has a coil axis that is substantially coincident with said axis of said spindle.

10. The bicycle pedal according to claim 9 wherein two of said hooked members are affixed to said housing and the other of said hooked members pivot on said housing.

11. The bicycle pedal according to claim 9 wherein all of said hooked members pivot on said housing.

12. The bicycle pedal according to claim 10 wherein said housing rotates about said spindle on at least one bearing.

13. The bicycle pedal according to claim 12 wherein said pedal is substantially symmetric about the axis of said pedal along each of two perpendicular planes.

14. The bicycle pedal according to claim 13 wherein said hooked members are formed in part by bent wire.

15. A bicycle pedal for releasibly engaging a cleat affixed to the bottom of a shoe, said pedal comprising:
    a spindle with a thread on one end for attachment to a bicycle crank arm;
    a housing that rotates about said spindle; and
    a spring loaded latch mechanism that pivots concentrically with the axis of said spindle, wherein said latch mechanism comprises:
        a plurality of substantially rectangular shaped members having four sides, at least one said rectangular shaped member having a hub-like device built into two opposing ones of said sides; and
        at least one spring that holds said rectangular shaped members apart from each other at substantially equal angles of spacing;
    wherein said latch mechanism allows engagement with said cleat between adjacent pairs of said rectangular shaped members.

16. The bicycle pedal according to claim 15 wherein said spring has a coil axis that is substantially coincident with said axis of said spindle.

17. The bicycle pedal according to claim 16 wherein one of said rectangular shaped members is affixed to said housing and the other said rectangular shaped members pivots on said housing.

18. The bicycle pedal according to claim 16 wherein all of said rectangular shaped members pivot on said housing.

19. The bicycle pedal according to claim 17 wherein said housing rotates about said spindle on at least one bearing.

20. The bicycle pedal according to claim 19 wherein said pedal is, except for said spring or springs, substantially symmetric about the axis of said pedal along each of two perpendicular planes.

* * * * *